United States Patent
Müller et al.

(10) Patent No.: US 10,126,124 B2
(45) Date of Patent: Nov. 13, 2018

(54) SURVEYING DEVICE HAVING BALL-POINT BEARING

(71) Applicant: LEICA GEOSYSTEMS AG, Heerbrugg (CH)

(72) Inventors: Josef Müller, Oberegg (CH); Stefan Petkov, Flums (CH); Benjamin Schöll, Hauptwil (CH)

(73) Assignee: LEICA GEOSYSTEMS AG, Heerbrugg (CH)

(*) Notice: Subject to any disclaimer, the term of this patent is extended or adjusted under 35 U.S.C. 154(b) by 313 days.

(21) Appl. No.: 14/880,204

(22) Filed: Oct. 10, 2015

(65) Prior Publication Data

US 2016/0102976 A1 Apr. 14, 2016

(30) Foreign Application Priority Data

Oct. 10, 2014 (EP) .................................... 14188460

(51) Int. Cl.
| | | |
|---|---|---|
| *G01C 3/02* | (2006.01) | |
| *G01C 15/00* | (2006.01) | |
| *F16C 19/50* | (2006.01) | |

(52) U.S. Cl.
CPC .............. *G01C 3/02* (2013.01); *F16C 19/507* (2013.01); *G01C 15/002* (2013.01); *F16C 2370/00* (2013.01); *F16C 2370/20* (2013.01)

(58) Field of Classification Search
CPC .......... G01B 11/26; G01C 1/02; G01C 15/00; G02B 23/16
See application file for complete search history.

(56) References Cited

U.S. PATENT DOCUMENTS

| | | | |
|---|---|---|---|
| 3,958,904 A * | 5/1976 | Rusbach | F16C 11/106 403/90 |
| 4,455,758 A | 6/1984 | Iwafune et al. | |
| 6,622,391 B1 | 9/2003 | Shirai et al. | |
| 7,999,921 B2 | 8/2011 | Herbst et al. | |
| 2005/0057745 A1* | 3/2005 | Bontje | G01C 15/002 356/139.03 |
| 2007/0151387 A1* | 7/2007 | Vogt | F16C 11/106 74/473.34 |
| 2008/0121767 A1* | 5/2008 | Wimberley | F16M 11/14 248/181.1 |
| 2010/0177508 A1* | 7/2010 | Maglica | F21L 4/027 362/183 |

FOREIGN PATENT DOCUMENTS

| | | |
|---|---|---|
| CH | 582 346 A5 | 11/1976 |
| CN | 101014829 A | 8/2007 |
| CN | 201653421 U | 11/2010 |
| DE | 10020978 A1 | 11/2000 |
| WO | 2011/098127 A1 | 8/2011 |

OTHER PUBLICATIONS

European Search Report dated Apr. 21, 2015 as received in Application No. EP 14188460.

* cited by examiner

*Primary Examiner* — Luke D Ratcliffe

(74) *Attorney, Agent, or Firm* — Maschoff Brennan

(57) ABSTRACT

In a surveying device having a base for positioning the surveying device and a pitch component having an optical beam path for surveying a target, the pitch component is radially and axially mounted and is rotatable in relation to the yaw component in a yaw component, which is movable in relation to the base, on the basis of a rotation body chucked in a self-centering manner in two cavities.

18 Claims, 7 Drawing Sheets

SURVEYING DEVICE HAVING BALL-POINT BEARING

FIELD OF THE INVENTION

The invention relates to a surveying device.

BACKGROUND

In many surveying devices, the alignment of oriented optical measurement radiation is required, for example, by aligning components which integrate the beam path or by focusing on a target. In this case, this modification must be performed precisely and, in the case of dynamic applications, also sufficiently rapidly so that, for example, large masses to be moved are disadvantageous. In addition, field readiness of the measuring device fundamentally requires robustness of the drive and the bearings and low power consumption.

An industrial or geodetic surveying device generally has a standing axis and a tilt axis, which are mounted and driven. Examples of such measuring devices are total stations, theodolites, or tachymeters which—also together with integrated automatic target acquisition and target tracking units—are used for manifold surveying tasks, wherein both obtaining data and also solely checking, for example, in construction site monitoring, come into consideration. Other measuring devices are, for example, scanner systems such as laser trackers, laser scanners, or profilers, which record topographies of surfaces as three-dimensional point clouds in the scanning method.

The precision of the axes is distinguished above all by way of the bearings. The bearings must be dimensionally accurate, dimensionally stable, and shock resistant or protectable from shock. To be able to execute positioning actions in very small angle intervals with high precision, extremely low friction is additionally required, wherein in particular the friction force during the transition from adhesion to sliding is relevant.

In previous solutions, roller bearings and/or plain bearings were frequently used for the purpose of mounting. Such bearings require a relatively large amount of structural space, however, in particular also because usually at least one bearing must be installed for the axial mounting and one must be installed for the radial mounting. An increased constructive and manufacturing expenditure results due to this circumstance, and therefore higher costs. More masses are also moved due to the lack of compactness.

SUMMARY

Some embodiments of the present invention may provide an industrial or geodetic surveying device, which has bearings for its rotating components, which spontaneously compensate for wear-related bearing play and therefore ensure geometrical stability.

Some embodiments may provide an industrial or geodetic surveying device which has a reduced number and/or complexity of its bearing components or a reduced structural size.

Some embodiments may provide an industrial or geodetic surveying device which has a protective mechanism against shock damage, so that the probability of the occurrence of damage to the bearing is reduced in the event of shock.

A surveying device according to the invention, in particular a total station, a tracker, or a scanner, has at least an optical measurement beam path, a base for positioning the surveying device, a yaw component, which is mounted so it is rotatable on the base about a standing axis, for the azimuthal alignment of the optical beam path, and a pitch component, which is mounted so it is rotatable in the yaw component about a tilt axis, for the elevation alignment of the optical beam path.

According to the invention, the surveying device is designed so that it uses ball-point bearings for mounting its components. The mounting of at least one component to be rotated of the geodetic measuring device is performed according to the invention by a ball-point bearing. This component modifies a beam path used for measurement, for example, by way of an alignment or change of the alignment.

A ball-point bearing is distinguished in that a rotor is mounted in relation to a stator by means of a rotation body—in particular a sphere, or also, for example, by means of an ovoid, double cone (having points facing away from one another), truncated double cone, or a combination of the mentioned bodies, wherein the three participating components remain stably aligned on one another, in that rotor and stator have a specially formed, centering seat for the rotation body. This seat is a cavity which encompasses the rotation body in a self-centering and stable manner. The cavity can be, for example, toric, tapered, conical, spherical, or aspherical. The rotation body is only sunk into the respective cavity or still protrudes out of the respective cavity in this case enough that the rotor slides on the rotation body and the rotation body slides on the stator, without rotor and stator touching.

Alternatively, the rotation body can be fixed on rotor or stator—for example, by clamping, gluing, or welding—or can be embedded therein, so that sliding only occurs on the respective other side. The protruding end of the rotation body is then a rotationally-symmetrical protrusion, in particular a hemisphere, a half ovoid, a cone, a truncated cone, or an asphere. Alternatively, this protrusion can also simultaneously be incorporated into the component—for example, by cutting machining—whereby the rotation body becomes part of the rotor or stator, wherein consideration has to be taken of the material hardness with respect to the wear.

The loose rotation body is chucked for a stable seat between stator and rotor, for example, by an axially acting spring element or a magnet or electromagnet, which ensures the cohesion of rotor and stator.

In spite of the term "ball-point bearing", point contact does not exist between the rotation body and the cavity of the rotor or stator, but rather at least a three-point contact (cavity is a three-sided pyramid, for example), and preferably an at least sectionally linear contact (cavity is rotationally symmetrical) or even a surface contact, which can be achieved, for example, by intentional impression of the rotation body in the cavity. The term "ball-point bearing" instead refers to the pivot point of the bearing established by the rotation body—preferably a sphere.

According to the invention, the ball-point bearing also implements an axial and radial mounting on the basis of only a single element in a comparatively small structural space. A sphere is chucked between the cavity of a rotating component (rotor) and the cavity of a stationary component (stator), wherein the rotating component and the stationary component are opposite to one another and the center axes of the cavities either extend coaxially or intersect in the sphere. A spring element, which is required in any case for the contact pressure of an ultrasound motor which drives the axis, in particular a traveling wave motor, can be used in particular for the pre-clamping or clamping. The axial force, which occurs as a side effect upon the use of an axial flux motor (axial flux machine), can also be used for this purpose.

If the cavities are embodied as conical, for example, the sphere has a ring-shaped contact line on both sides. The components slide rotationally on one another along these contact lines. Because this contact diameter of the sphere is small, the resistance torques caused by adhesive friction and sliding friction between the materials of the cavity and the rotation body are significantly less than in conventional bearings. Thus, only a minimal resistance is caused during the rotation—even in the case of high pre-clamping forces. This results in a lower power loss and therefore a longer battery run time.

From a tribological viewpoint, the ball-point bearing therefore represents a plain bearing. The carrying capacity of the ball-point bearing is therefore superior to that of a roller bearing with the same structural space.

Due to the small moving masses, the measuring device can be designed to be highly dynamic, so that the high speeds required for a scanning action can also be achieved. A measuring device according to the invention can therefore also be embodied as a target tracking system, laser tracker, scanner, or profiler.

In addition, maintenance-free operation or operation of the device which is reduced with respect to maintenance is possible due to the simple structure of ball-point bearings and the design according to the invention of a geodetic measuring device. Ball bearings, for example, made of hardened steel, ceramic, or other hard materials, which are manufactured with comparatively low expenditure and additionally with high precision, are usable for the ball-point bearing.

The conical cavity in the respective component can optionally result from the centering borehole or can even be the centering borehole itself (without further machining steps), which is required in any case on the end side for the chucking of the component during the turning and/or grinding process. All component surfaces which are machined on the turning and/or grinding machine are concentric or perpendicular with high precision to the axis of the cavity, because the axis of the machining process is identical to just this axis.

In case of shocks, ultra-precise structures and components in the interior of a surveying device are threatened with damage. The ball-point bearing is therefore axially pre-clamped, for example, via a magnetic force or spring force, such that the structure is protected against radial shock. In case of a radial shock, the rotor can at least temporarily "unlatch" and therefore "absorb" a shock, in that the rotation body leaves its centered intended bearing seat. The rotor can therefore recoil by an axial distance against the pre-clamping force, since the rotation body rolls along the lateral surface of at least one of the two conical cavities. However, the rotation body is prevented from completely leaving the cavity in that the unlatching distance of the rotor is radially limited by a stop.

The ball-point bearing is also resistant to shocks in the axial direction. The bearing ball material is selected to be harder than that of the bearing seats. Therefore, a deformation of the bearing seats takes place in any case insofar as the balls impress their circumference into the bearing seat. The spherical centered impression does not change the centering of the bearing seat, however.

In a further embodiment of the invention, a horizontal ball-point bearing is equipped with an additional radial shock safeguard. For this purpose, a further—for example, conical—cavity, which is incorporated as a channel in the lateral surface of the first cavity, ensures that the balls rest not with only one circumferential point, but rather on the edges between the first and second cavities—almost as if "on rails"—during the above-described "unlatching". The load transmitted by the rotation body is thus distributed onto two support points. For example, this protective channel is located in the lower part of the cavity of the stator and/or in the upper part of the cavity of the rotor. Another configuration of the channel or channels or multiple channels per cavity in various directions are also according to the invention.

BRIEF DESCRIPTION OF THE DRAWINGS

The surveying device according to the invention will be described or explained in greater detail solely as an example hereafter on the basis of exemplary embodiments which are schematically illustrated in the drawing. In the specific figures.

DETAILED DESCRIPTION

Figure 1:
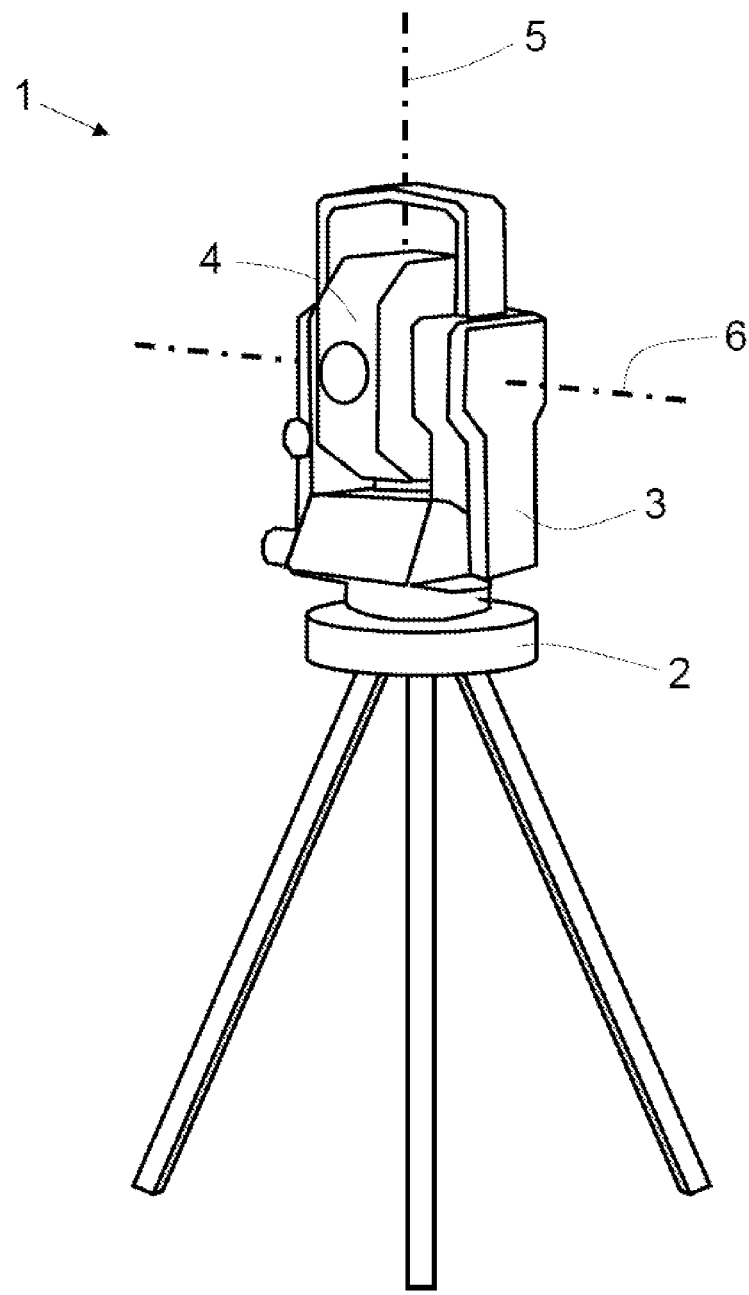
FIG. 1 shows the schematic illustration of a surveying device.

FIG. 1 shows a surveying device 1 having base 2, yaw component 3, and pitch component 4, wherein the axis of rotation of the yaw component is the standing axis 5 and the axis of rotation of the pitch component is the tilt axis 6.

Figure 2A:
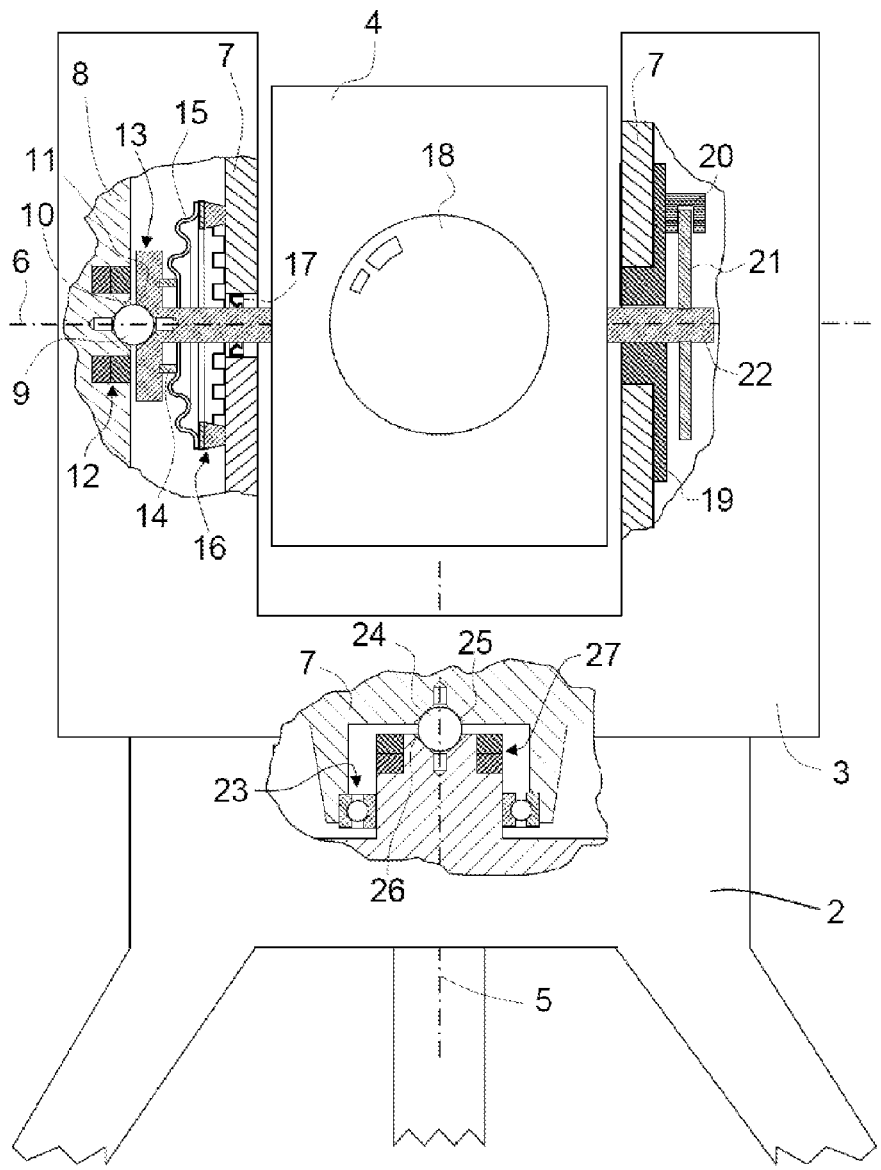
FIG. 2a shows the illustration of a surveying device in a front view with cut-out details of the ball-point bearings according to the invention, wherein one side of the pitch component is mounted in a V-bearing.

FIG. 2a shows a surveying device 1 in a side view with breakouts at the bearing seats of the pitch component 4 and the yaw component 3. The bearing components are shown in section at these points.

The pitch component 4, which holds an optical system 18, has a tilt axis 6, which is implemented by the bearing according to the invention of the shaft 22. At one end, the shaft 22 has a flange 13, which is centrally provided with a rotationally-symmetrical conical cavity 11 (conical borehole). A further conical cavity 10 is located in the side cover 8, which is part of the yaw component 3, as is the body 7. Instead of the side cover 8, a separate support structure in the interior of the yaw component 3, which is independent of the external housing of the surveying device, is also implementable for the housing of the cavity 10.

As shown, the cavities 10 and 11 can have a tap-hole borehole in this case, since this is possibly required in manufacturing. A rotation body 9 in the form of a ball is located framed in the cavities 10 and 11. Since the cavities 10 and 11 and the ball 9 are rotationally-symmetrical with respect to the tilt axis 6, the chucking of the ball 9 has a self-centering effect. The ball 9 has a ring-shaped linear contact in the engagement with the two cavities 10 and 11. In the example shown, the pre-clamping—and therefore the chucking of the ball 9—is performed on one hand by the magnets 12, which attract the flange 13 and are incorporated in the side cover 8. On the other hand, a spring element 15 presses the flange 13 via a sleeve 14 against the ball 9. In this case, the spring element 15 is supported on a traveling wave motor 16, which drives the axis, and which rests on the body 7 of the yaw component 3.

This traveling wave motor 16 is rigidly connected to the flange 13 via the spring element 15 and the sleeve 14 and therefore drives the shaft 22. A traveling wave is generated via an ultrasonic excitation of the toothed elastic metal ring, which is generated by the piezoceramic clamping ring, whereby the rotational drive torque results in conjunction with the contact pressure. A gearless, space-saving, and relatively simple drive is implemented using the traveling wave motor, wherein a synergistic effect additionally occurs in conjunction with the ball-point bearing due to the pre-clamping, which is usable for both purposes.

To protect the precision components, a flexible, i.e., non-mounting seal 17 seals the shaft 22 at the shaft exit in relation to the environment.

The floating mounting of the other side of the shaft 22 is performed via a conventional V-bearing 19, which is installed in the body 7. An angle measuring system—consisting of encoder 20 and code disk 21—is also located at this shaft end.

The yaw component 3 is also mounted on the base 2 so it is rotatable about the standing axis 5 on the basis of this principle according to the invention in FIG. 2a. The ball 24 is clamped from above and below in this case by two conical cavities 25 and 26, wherein the ball centers itself and therefore the yaw component 3 and the base 2. Magnets 27 are also used in this exemplary embodiment to provide a further pre-clamping force in addition to gravity, which holds the yaw component 3 and the base 2 on one another. This further pre-clamping also enables upside-down operation.

Figure 2B:
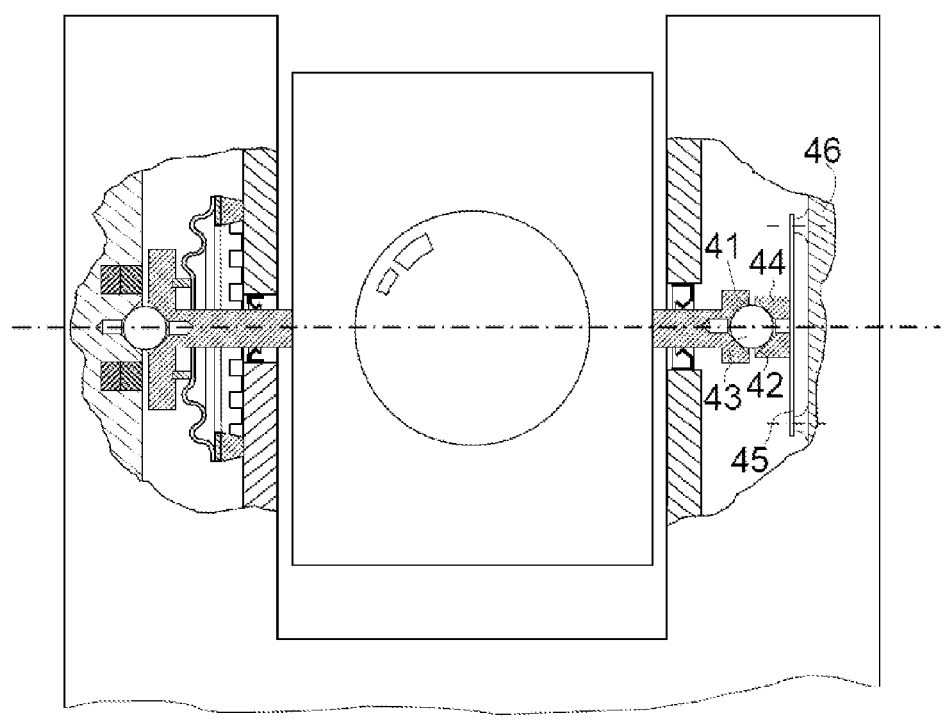
FIG. 2b shows the illustration of a surveying device in a front view with cut-out details of the ball-point bearings according to the invention of the pitch component.

As shown in FIG. 2b, instead of the floating mounting in 19, a further ball-point bearing is provided for this upside-down operation, implemented by the cavities and 42, between which the ball 43 is chucked, wherein the chucking is performed by the spring plate 45, which supports the block 44 and is anchored on the holder 46. In this case, the spring element is thus arranged "outside", where it ensures the required length expansion compensation and the required pre-clamping. The block 44 containing the cavity 42, the spring plate 45, and the holder 46 are considered to belong to the yaw component 3.

Figure 3A:
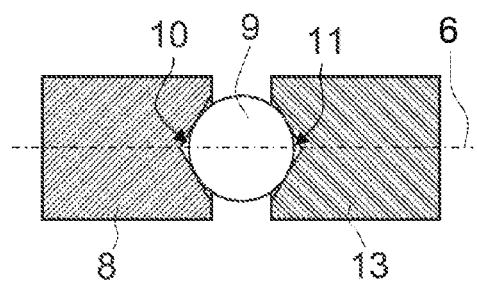
FIGS. 3a-b show the schematic illustrations of two fundamental exemplary embodiments of a ball-point bearing of a measuring device according to the invention.
Figure 3B:
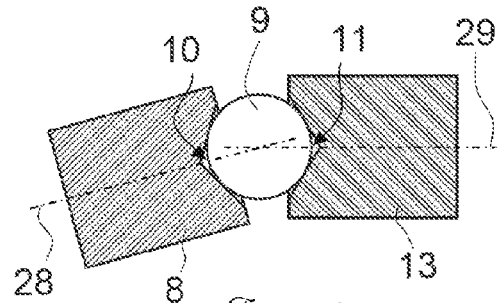

FIGS. 3a and 3b show the side cover 8 (stator), the flange 13 of the shaft 22 (rotor), and the rotation body 9, which is a ball in the illustrated examples.

The cavities 10 and 11 in FIG. 3a are rotationally-symmetrical conical boreholes, which are coaxial to one another, whereby the ball has ring-shaped linear contacts on both sides in the cavities and these contact rings are parallel to one another, so that the chucked ball causes rotor and stator to be coaxially arranged.

FIG. 3b shows the case that the center axes 28 and 29 of the ball 9, which extend orthogonally through the planes which are each spanned by the contact points or the contact ring between the ball and the respective cavity, are not aligned, but rather intersect one another in the ball center. This enables the stator bearing to be designed still better for the main load direction (standing device). The center axis 29 corresponds to the tilt axis 6 of the rotor.

FIGS. 4a to 4f show embodiments of the cavities or rotation bodies.

Figure 4A:
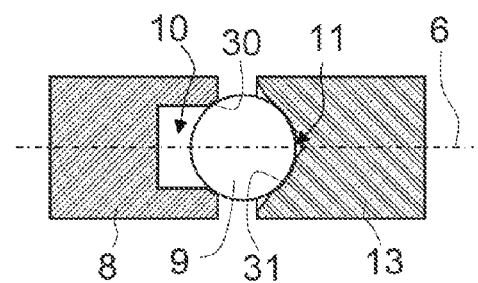
FIGS. 4a-f show the schematic illustrations of six exemplary embodiments of a ball-point bearing of a measuring device according to the invention.

FIG. 4a shows cavity 10 as a cylindrical borehole, which has a partial uniform imprint 30 due to an indentation of the ball 9. The cavity 11 embodied as a conical borehole also has an imprint 31 of the ball. The ball 9 no longer only has a linear contact, but rather a planar, circumferential contact with the cavities due to the imprints 30 and 31, which increases the carrying capacity of the bearing. Cavity 10 and cavity 11 share an axis of symmetry, the tilt axis 6.

Figure 4B:
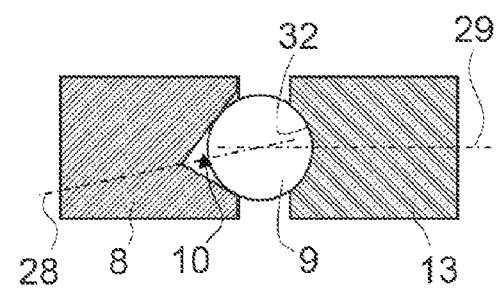

FIG. 4b shows a further example of intersecting center axes 28 and 29, wherein the center axis 29 corresponds to the tilt axis 6. The fact that the axes are not coaxial to one another is caused by an asymmetrical conical borehole 10, which is responsible for inclined support of the ball 9. This inclined support can counteract a radial overload acting from above on the flange 13, for example. The ball has a glued, soldered, or welded seat 32 in the flange 13 and is therefore fixed. Rotational sliding therefore only takes place in the cavity 10.

Figure 4C:
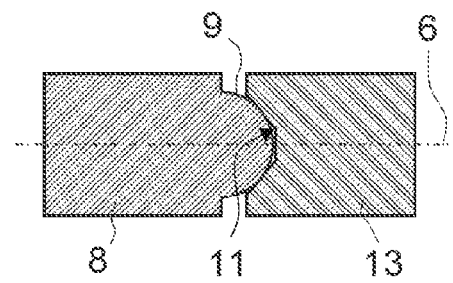

FIG. 4c shows a hemisphere 9 as the rotation body, which was incorporated into the side cover 8, for example, by cutting manufacturing or forging. Rotational sliding therefore only occurs in the cavity 11, which is embodied as an example as a countersunk borehole in the form of a truncated cone.

Figure 4D:
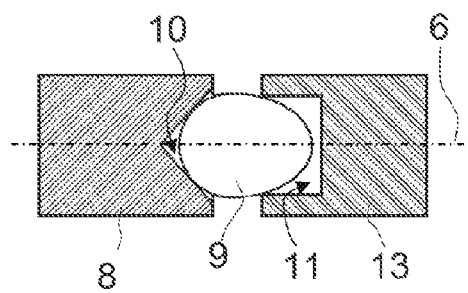

FIG. 4d shows an ovoid 9 as a rotation body, which is incorporated at its blunter end in a conical borehole 10 and at its more pointed end in a cylindrical borehole 11. The ovoid centers itself in the two cavities and has ring-shaped contact with both of them.

Figure 4E:
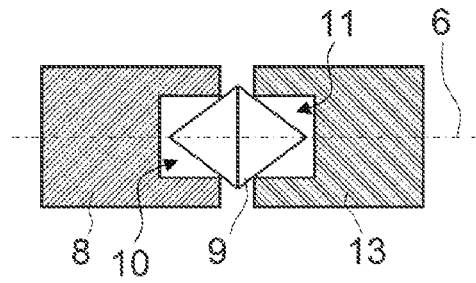

FIG. 4e shows, as a further exemplary embodiment of the invention, a double cone incorporated in two cylindrical boreholes 10 and 11, which is also held in a self-centering and stable manner therein by a corresponding pre-clamping. The rotation body 9 can also have at least three punctiform and/or linear support contacts with the cavities 10 and 11, if they are not rotationally-symmetrical, but rather have a polygonal profile, for example (for example, hexagonal socket).

Figure 4F:
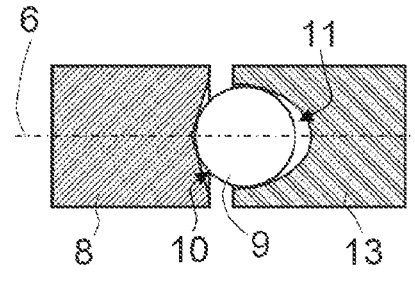

FIG. 4f shows a last example of the embodiment of the cavities 10 and 11 and of the rotation body 9. A conical depression 10 is shown as a cavity in the side cover 8 and an ellipsoid flattened dome 11 is shown as a cavity in the flange 13 of the rotor. A ball 9 has a self-centering engagement in the two mentioned cavities. Jamming of the ball 9 can be caused by the moderate taper of the flattened dome 11, whereby the ball 9 would only slide rotationally in the depression 10.

For FIGS. 3a and 3b and 4a to 4f, side cover 8 and flange 13 or cavity 10 in the stator and cavity 11 in the rotor can alternatively each be identified the other way around, since the corresponding reversed arrangement is also applicable. The embodiments of the cavities shown in these figures can be combined with one another arbitrarily if necessary, in particular also with the embodiment of the rotation body 9.

Figure 5A:
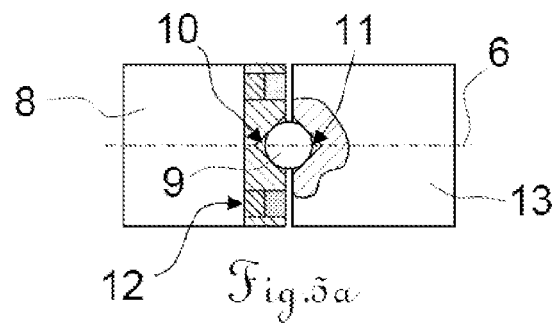
FIGS. 5a-d show the schematic illustrations of three exemplary embodiments of the pre-clamping of a ball-point bearing according to the invention.
Figure 5B:
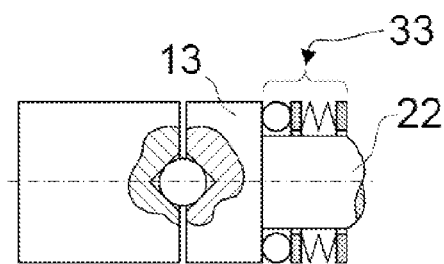
Figure 5C:
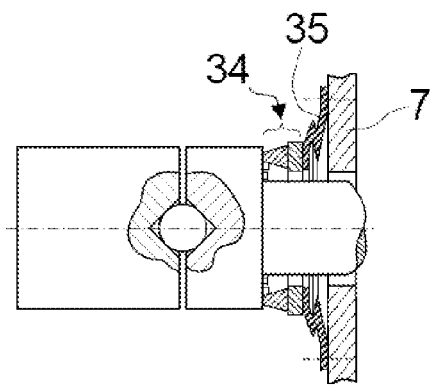

FIGS. 5a to 5c show details of schematic sketches of possible exemplary embodiments for the pre-clamping of the ball-point bearing.

FIG. 5a shows the pre-clamping by magnetic force. For this purpose, a magnet 12, which can also be embodied as an electromagnet, is incorporated in the side cover 8, for example. The magnet can also be positioned accordingly in the opposing flange 13 of the shaft 22. The magnet 12 is constructed as at least partially ring-shaped, for example, and encloses the cavity 10 or 11. The magnet either attracts the material of the opposing element itself or—if this counter element is not ferromagnetic, for example—a separate ferromagnetic component, which is incorporated for this purpose in the respective counter element and is connected thereto.

FIG. 5b schematically shows an axial spring component 33 used for the clamping of the ball 9 between the cavities 10 and 11, which consists of an axial roller bearing and coiled springs, which are embedded between two flat washers and are circumferentially distributed. The axial spring component 33 is supported, for example, on the body 7 of the yaw component (not shown) and therefore causes a pre-clamping force. For the rotation of the shaft 22, the axial roller bearing of the axial spring component 33 enables rolling on the flange 13.

FIG. 5c shows the pre-clamping of a ball-point bearing with the aid of a spring element, namely a spring bellows 35, which is required for a traveling wave motor 34. This piezoelectric traveling wave motor itself requires contact pressure, which is implemented by the spring bellows 35, for movement transmission. Not only is the motor 34 thus pressed against the flange 13, but rather also the flange 13 is pressed via the ball 9 on the side cover 8—due to the support on the body 7.

Figure 5D:
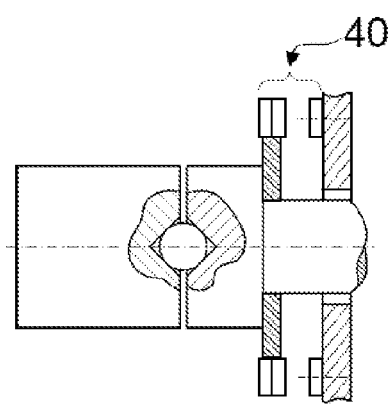

FIG. 5d shows a further alternative of the dynamic bearing compression by an axial flux machine 40. The movement-generating elements (magnets on the rotor and copper coils on the stator) magnetically repel one another in this case and thus generate the pre-clamping, as a kind of side effect to the propulsion.

The pre-clamping possibilities, which are shown solely as examples in FIGS. 5a to 5d, are also transferable to the vertical ball-point bearing, i.e., to the rotation body 24 chucked between the cavities 25 and 26.

Figure 6A:
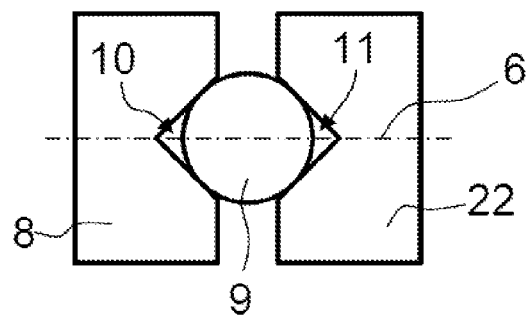
FIGS. 6a-c show the schematic illustrations of the radial and the axial shock protection mechanism, provided by the ball-point bearing.
Figure 6B:
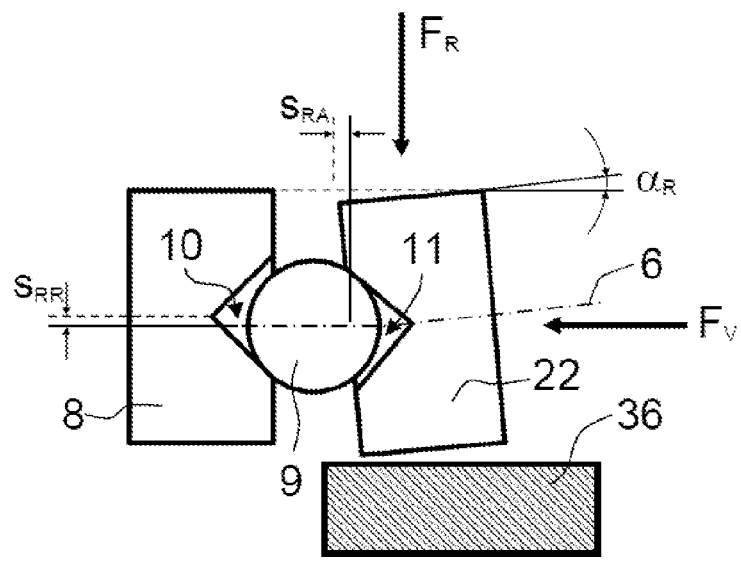
Figure 6C:
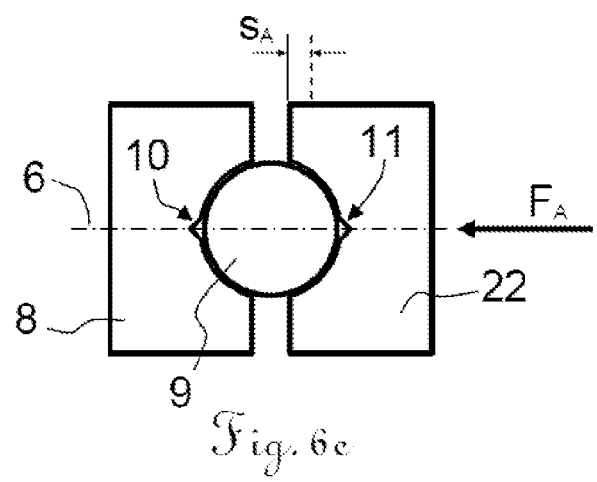
Figure 7A:
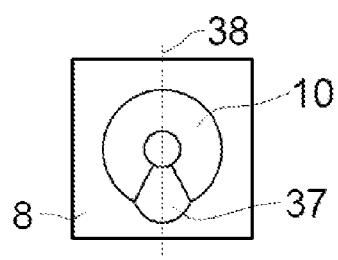
FIGS. 7a-b show the illustration of the additional cavity in the lower part of the stationary bearing seat in a front view and a sectional side view.
Figure 7B:
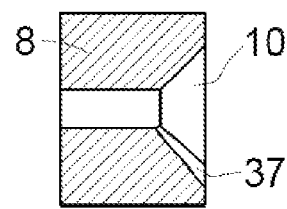

FIGS. 6a to 6c illustrate the shock protection mechanism in the event of radial and axial load. FIG. 6a only shows the starting reference with respect to the radial and axial offsets shown in FIGS. 6b and 6c. In this "normal state" shown in FIG. 6a, the ball 9 rests centered in the two cavities 10 and 11, whereby the mounting of the shaft 22 for rotation about the tilt axis 6 is implemented.

If a radial shock force $F_R$ would exceed the carrying capacity of the bearing material, the axial pre-clamping force $F_V$ can thus be dimensioned so that this shock force $F_R$ results in the "unlatching" of the bearing. This prevents the bearing from overloading in the event of shocks. Such an unlatching situation is shown in FIG. 6b. The ball 9 leaves its stable bearing seat in cavities 10 and 11. As a result, the shaft 22 experiences a tilt about the support 19, which is expressed at the ball-point bearing by the angle $\alpha_R$, the axial offset $S_{RA}$ and the radial offset $S_{RR}$. The tilt axis 6 is skewed according to the angle $\alpha_R$. However, a radial stop 36 delimits the release distance just so that the ball 9 is always held between the cavities 10 and 11 and cannot fall out.

If, according to FIG. 6c, a shock $F_A$ occurs in the axial direction, it thus results in the pressing of the ball 9 into the cavity 10 or 11 because of the hardness difference of the materials. The true running properties are thus not impaired, since a dimensionally accurate image of the harder ball 9 in the softer conical borehole 10 or 11 occurs in this case. The axial offset $S_A$ thus created is compensated for via the remaining pre-clamping.

The unlatching action illustrated in FIG. 6b—on one side on the stator 8—is illustrated once again in FIGS. 7a to 11c, wherein the countersunk borehole 10 is additionally equipped with a guide channel 37.

FIGS. 7 to 11 indexed with a show the portion of the side cover 8 in a top view with the conical borehole 10 and the depressed channel 37 below. FIGS. 8 to 11 indexed with a additionally also show the rotation body 9, which rests completely in the "normal state" in FIGS. 8a-c and therefore has a linear contact with the conical borehole 10. In FIG. 9a, the ball 9 has left its normal seat, now rests in the channel 37, and therefore has a two-point contact with the lateral surface of the conical borehole 10. As FIGS. 9a, 10a, and 11a cumulatively illustrate, the ball runs further in the channel 37 as if "on rails".

In FIGS. 7 to 11 indexed with a, the sectional plane 38 is additionally marked by a dashed line in each case, which is shown in FIGS. 7 to 11 indexed with b.

Figure 8A:
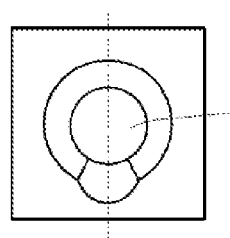
FIGS. 8a-c show the illustration of the additional cavity in the lower part of the stationary bearing seat with rotation body in normal engagement in a front view, sectional side view, and sectional front view.
Figure 8B:
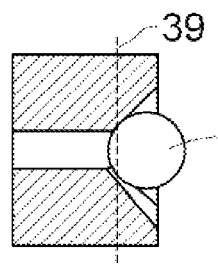
Figure 8C:
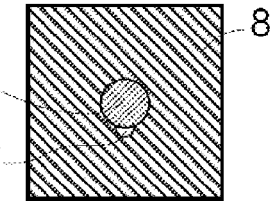
Figure 9A:
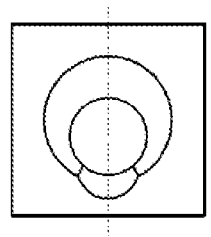
FIGS. 9a-c show the illustration of the additional cavity in the lower part of the stationary bearing seat with rotation body in the "unlatched" state in a front view, sectional side view, and sectional front view.
Figure 9B:
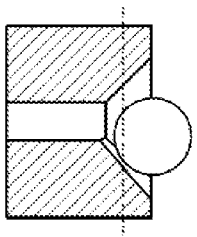

FIGS. 7b, 8b, 9b, 10b, and 11b therefore show a central section through the objects illustrated in FIGS. 7a, 8a, 9a, 10a, and 11a. A portion of the side cover 8, the channel 37, and the conical borehole 10 are visible in the side view. FIGS. 8 to 11 indexed with b additionally also show the rotation body 9, which completely rests in the "normal state" in FIG. 8b and therefore has a linear contact with the conical borehole 10. In FIG. 9b, the ball 9 has left its normal seat, now rests in the channel 37, and therefore has a two-point contact with the lateral surface of the conical borehole 10. As FIGS. 9b, 10b, and 11b cumulatively illustrate, the ball runs further in the channel 37 as if "on rails".

In FIGS. 8 to 11 indexed with b, the sectional plane 39 is additionally marked by a dashed line in each case, which is shown in FIGS. 8 to 11 indexed with c.

Figure 9C:
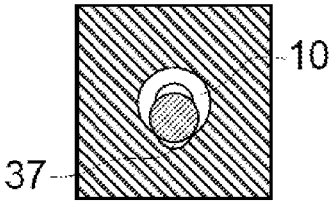
Figure 10A:
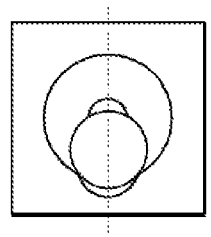
FIGS. 10a-c show the illustration of the additional cavity in the lower part of the stationary bearing seat with rotation body in the "unlatched" state in a front view, sectional side view, and sectional front view.
Figure 10B:
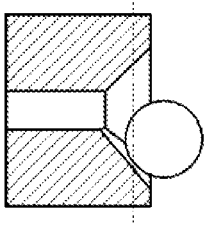
Figure 10C:
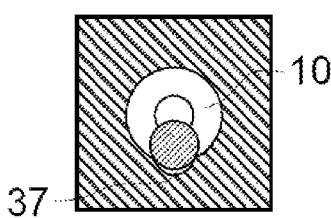
Figure 11A:
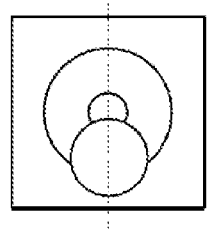
FIGS. 11a-c show the illustration of the additional cavity in the lower part of the stationary bearing seat with rotation body in the "unlatched" state in a front view, sectional side view, and sectional front view.
Figure 11B:
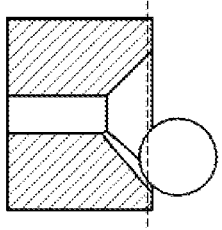
Figure 11C:
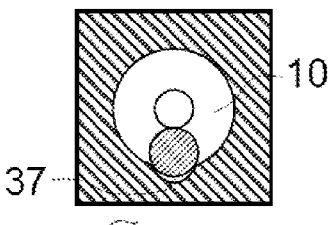

FIGS. 8c, 9c, 10c, and 11c thus show a perpendicular section through the plane of the respective ball support contact from FIGS. 8b, 9b, 10b, and 11b. A portion of the side cover 8, the channel 37, and the ball 9 are visible in a top view in section. FIGS. 9 to 11 indexed with c additionally also show the conical borehole 10, which now becomes visible because of the above-mentioned release action. FIG. 8c shows the "normal state", in which the ball 9 rests in the conical borehole 10, therefore has a linear contact with the conical borehole 10, and thus entirely covers the conical borehole 10. In FIG. 9c, the ball 9 has left its normal seat, now rests in the channel 37, and therefore has a two-point contact with the lateral surface of the conical borehole 10. As FIGS. 10c and 11c cumulatively illustrate, the ball runs further in the channel 37 as if "on rails".

It is apparent to a person skilled in the art that the various means for modifying the optical beam path can be combined with one another in an alternative or supplementary manner.

The ball-point bearing can also be arranged at points of the surveying device other than those illustrated.

What is claimed is:

1. A surveying device comprising:
   an optical measuring beam path;
   a base for positioning the surveying device;
   a yaw component, which is mounted so it is rotatable on the base about a standing axis, for the azimuthal alignment of the optical beam path; and
   a pitch component, which is mounted so it is rotatable in the yaw component about a tilt axis, for the elevation alignment of the optical beam path, wherein:
   a rotation body, in particular a ball, is chucked in a self-centering manner between a cavity in the yaw component and a cavity at one end of the pitch component shaft, so that the pitch component is slide-mounted so it is rotatable at said end both radially and also axially in the yaw component on the basis of the rotation body chucked in the cavities.

2. The surveying device according to claim 1, wherein the surveying device comprises a total station, tracker, or scanner.

3. The surveying device according to claim 1, wherein:
   the other end of the pitch component shaft is mounted by a radial free bearing or by a rotation body, in particular a ball, which is chucked in a self-centering manner between
   a cavity in the yaw component and
   a cavity at one end of the pitch component shaft.

4. The surveying device according to claim 3, wherein the radial free bearing comprises a conventional V-bearing.

5. The surveying device according to claim 1, wherein:
   the cavity in the yaw component has at least one channel.

6. A surveying device comprising:
   an optical measuring beam path;
   a base for positioning the surveying device;
   a yaw component, which is mounted so it is rotatable on the base about a standing axis, for the azimuthal alignment of the optical beam path; and
   a pitch component, which is mounted so it is rotatable in the yaw component about a tilt axis, for the elevation alignment of the optical beam path, wherein:
   a rotation body, in particular a ball, is chucked in a self-centering manner between a cavity in the base and a cavity in the yaw component, so that the yaw component is slide-mounted so it is rotatable both radially and also axially on the base on the basis of the rotation body chucked in the cavities.

7. The surveying device according to claim 6, wherein:
   at least one cavity has a widening lateral surface, along which the rotation body slides, while leaving its centering seat, in the event of overload and slides back into its centering seat in the event of relief.

8. The surveying device according to claim 6, wherein:
   the rotation body rests by way of at least three contact points, in particular at least partially in a linear or planar manner, in the cavities.

9. The surveying device according to claim 6, wherein:
   the cavities are conical boreholes opposite to one another, wherein the conical tapers point away from one another.

10. The surveying device according to claim 6, wherein:
    the rotation body is chucked by means of at least one magnet and/or by means of at least one mechanical spring.

11. The surveying device according to claim 6, wherein:
    the rotation body is fixedly connected to one of the two cavities.

12. The surveying device according to claim 6, wherein:
    the rotation body is a component of the yaw component, the pitch component shaft, or the base.

13. The surveying device according to claim 6, wherein:
    the rotor is drivable by a traveling wave motor, wherein the pre-clamping of the axial-radial bearing formed by the rotation body is produced via the pre-clamping element required for the traveling wave motor.

14. The surveying device according to claim 6, wherein:
    the rotor is drivable by an axial flux motor, wherein the pre-clamping of the rotation body is produced via the magnetic axial force generated by the axial flux motor.

15. The surveying device according to claim 6, wherein:
    the rotation body is ceramic or hard metal material and
    the degree of hardness of the material of the cavities is less than the degree of hardness of the rotation body material.

16. The surveying device according to claim 6, wherein:
    the centering borehole, which would be required in any case for the machining of the corresponding component on a turning and/or grinding machine, is used as the cavity.

17. A surveying device, comprising:
    an optical measuring beam path;
    a base for positioning the surveying device;
    a yaw component, which is mounted so it is rotatable on the base about a standing axis, for the azimuthal alignment of the optical beam path; and
    a pitch component, which is mounted so it is rotatable in the yaw component about a tilt axis, for the elevation alignment of the optical beam path, wherein:
    a rotation body, in particular a hemisphere or a half ovoid, is chucked in a self-centering manner in a cavity, which is provided on components of the yaw component or at one end of the pitch component shaft, as a bearing for the pitch component in relation to the yaw component, so that the pitch component is slide-mounted so it is rotatable both radially and also axially in the yaw component on the basis of the rotation body chucked in the cavity, wherein the rotation body is fixedly connected to the pitch component shaft or the yaw component, in particular is a component of the pitch component shaft or the yaw component.

18. A surveying device comprising:
    an optical measuring beam path;
    a base for positioning the surveying device;
    a yaw component, which is mounted so it is rotatable on the base about a standing axis, for the azimuthal alignment of the optical beam path; and
    a pitch component, which is mounted so it is rotatable in the yaw component about a tilt axis, for the elevation alignment of the optical beam path, wherein:
    a rotation body, in particular a hemisphere or a half ovoid, is chucked in a self-centering manner in a cavity, which is provided in the base or the yaw component, as a bearing for the yaw component in relation to the base, so that the yaw component is slide-mounted so it is rotatable both radially and also axially in relation to the base on the basis of the rotation body chucked in the cavity, wherein the rotation body is fixedly connected to the yaw component or the base, in particular is a component of the yaw component or the base.

* * * * *